United States Patent
Mueller et al.

(10) Patent No.: US 8,147,784 B2
(45) Date of Patent: Apr. 3, 2012

(54) COMBINED WASTE GAS TREATMENT OF WASTE GAS STREAMS CONTAINING AMMONIA AND NITROGEN OXIDES IN INDUSTRIAL PLANTS

(75) Inventors: Ivo Mueller, Dortmund (DE); Joachim Johanning, Oberhausen (DE)

(73) Assignee: Thyssenkrupp Uhde GmbH, Dortmund (DE)

( * ) Notice: Subject to any disclaimer, the term of this patent is extended or adjusted under 35 U.S.C. 154(b) by 0 days.

(21) Appl. No.: 13/257,452

(22) PCT Filed: Mar. 12, 2010

(86) PCT No.: PCT/EP2010/001576
§ 371 (c)(1),
(2), (4) Date: Sep. 19, 2011

(87) PCT Pub. No.: WO2010/105778
PCT Pub. Date: Sep. 23, 2010

(65) Prior Publication Data
US 2012/0009108 A1    Jan. 12, 2012

(30) Foreign Application Priority Data
Mar. 20, 2009  (DE) .......................... 10 2009 013 691

(51) Int. Cl.
*B01D 53/56* (2006.01)
*B01D 53/58* (2006.01)
(52) U.S. Cl. ...................... 423/235; 423/237; 423/239.1
(58) Field of Classification Search .................. 423/235, 423/237, 239.1
See application file for complete search history.

(56) References Cited

U.S. PATENT DOCUMENTS

| 3,607,022 A | | 9/1971 | Hausweiler et al. |
| 4,566,267 A | * | 1/1986 | Muller et al. .................... 60/784 |
| 4,744,962 A | | 5/1988 | Johnson et al. |
| 5,024,981 A | * | 6/1991 | Speronello et al. ............. 502/67 |
| 5,230,877 A | | 7/1993 | Eimer et al. |
| 5,304,362 A | | 4/1994 | Madsen |
| 6,261,345 B1 | | 7/2001 | Miyano et al. |

FOREIGN PATENT DOCUMENTS

| DE | 4314896 A1 | 11/1993 |
| DE | 69006367 T2 | 9/1994 |
| DE | 69530024 T2 | 12/2003 |
| EP | 0514729 B1 | 4/1996 |
| EP | 1350552 B1 | 1/2008 |

OTHER PUBLICATIONS

International Search Report for PCT/EP2010/001576 English translation attached to original both completed by the European Patent Office on Aug. 11, 2010. All together 4 Pages.

* cited by examiner

*Primary Examiner* — Timothy Vanoy
(74) *Attorney, Agent, or Firm* — Brooks Kushman P.C.

(57) ABSTRACT

Combined removal of both ammonia from an ammonia-containing waste gas and nitrogen oxides from a nitrogen oxide-containing waste gas in a combined ammonia/urea synthesis plant is accomplished by mixing the gases and employing one or both of selective non-catalytic reduction at a temperature of 850° C. to 1100° C. or selective catalytic reduction at a temperature of 150° C. to 550° C., in which the ammonia and the nitrogen oxides react with one another to give nitrogen and water, the ammonia-containing waste gas derived from a low-pressure and/or atmospheric absorber of the urea synthesis plant, and the nitrogen oxide-containing waste gas derived from a flue gas duct of a primary reformer of the ammonia synthesis plant, both the ammonia and the nitrogen oxides of the mixed waste gas flows being depleted simultaneously during the same process step.

10 Claims, 3 Drawing Sheets

Figure 1:
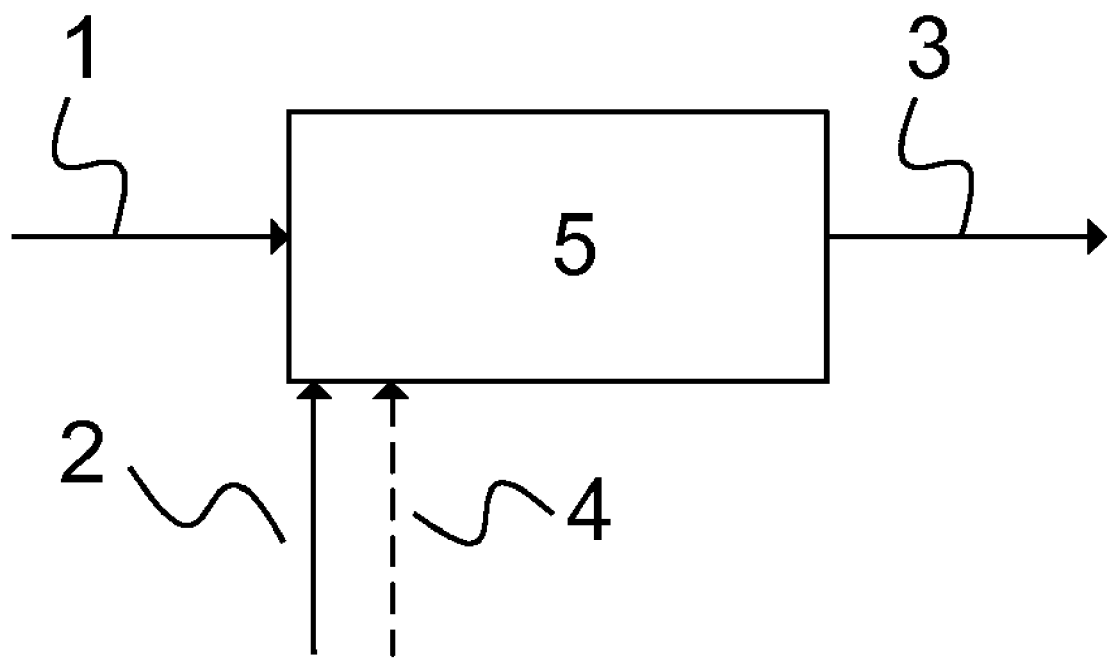

COMBINED WASTE GAS TREATMENT OF WASTE GAS STREAMS CONTAINING AMMONIA AND NITROGEN OXIDES IN INDUSTRIAL PLANTS

CROSS-REFERENCE TO RELATED APPLICATION

This application is the U.S. national phase of PCT Appln. No. PCT/EP2010/001576 filed Mar. 12, 2010 which claims priority to German application DE 10 2009 013 691.6 filed Mar. 20, 2009.

BACKGROUND OF THE INVENTION

1. Field of the Invention

The invention relates to a process and to its use for the combined removal of waste gas flows containing ammonia and nitrogen oxides in an industrial plant by selective non-catalytic reduction in a temperature range from 850° C. to 1100° C. or by selective catalytic reduction in a temperature range from 150° C. to 550° C. In this process conversion of ammonia and nitrogen oxides ($NO_x$) by previous mixing of two or more waste gas flows obtained in the industrial plant, the temperature of the mixture and the reduction rates of ammonia and nitrogen determining whether selective non-catalytic reduction or selective catalytic reduction is used. In this novel process, the two noxious substances (ammonia and nitrogen oxides) contained in the process waste gases serve one another as reaction partners for the purpose of an efficient mutual depletion, which is more cost effective than separate purification of the individual waste gas flows.

2. Description of the Related Art

In some branches of industry as, for example, in the fertiliser production, various process sections produce waste gas flows which are polluted with ammonia and/or nitrogen oxides and are to be purified before being discharged into the ambient air because of the environmental and olfactory pollution caused by such compounds. Such waste gas flows are, for instance, waste gas flows from the low-pressure absorber of a urea synthesis plant. Such waste gas flows pose a problem in so far as their emission values are far above the concentrations recommended by the Technical Instructions on Air Quality Control, First General Administrative Regulation pertaining to the Federal Air Pollution Control Act, as of 2002. According to these a value of 50 mg/Nm³, for example, is required for ammonia. Also partly contained in the waste gas are lower alkanes such as methane which is a strong greenhouse gas.

In the processes according to patent literature ammonia is removed from the waste air by addition of sulphuric acid or nitric acid. Such process is also known by the name of "acid scrubbing" as described in U.S. Pat. No. 3,607,022, for example. The ammonia is removed from the waste air flow by chemical absorption and in the presence of the acid solvent converted into the corresponding ammonium salt. If nitric acid is used, ammonium nitrate will be formed, if sulphuric acid is added, ammonium sulphate will be formed. The acid scrubbing process thus involves a very high demand for equipment and logistics, as—apart from the complex scrubber—the necessary quantities of acid have to be purchased and stored.

In addition, these ammonium salt-containing solutions produce waste water flows which cannot be discharged into the sewer system without further ado. Here as well, a purification is to be carried out and a solution for the disposal of the produced saline solution found.

Another process according to the state of the art for the removal of ammonia from waste gas flows is flare combustion. To ensure a minimum calorific value, it is necessary, however, to provide significant amounts of auxiliary gas depending on the concentration of the ammonia and other combustible pollutants, which will cause an increase of the carbon dioxide emissions of the plant. The ammonia combustion implemented in the flare also leads to the formation of nitrogen oxides which constitute, as already mentioned above, environmental pollutants themselves, so that the formation of these noxious substances should be avoided. Furthermore there are indications that the authorities in Europe consider open flares to be problematic for continuous operation as it is not possible to measure the emissions.

Another process for the purification of ammonia-containing waste gas flows is the selective oxidation described in DE 695 30 024 T2 and EP 0 514 729 B1, for example, which is carried out by means of specific catalysts. In the case of higher concentrations, however, adequate cooling is to be provided for the amounts of dissipated heat, which will increase the demand for equipment. Consequently this process is mainly suited for flows which are only polluted with minor amounts of ammonia.

Patent DE 43 14 896 A1 describes the depletion of ammonia by purposeful addition of nitrogen oxides. The nitrogen oxides required are produced by a separate source (e.g. diesel engine) or by partial oxidation of ammonia. The reaction of the ammonia and the nitrogen oxides in the presence of a catalyst essentially takes place according to the below reaction equations:

$$4NO + 4NH_3 + O_2 \rightarrow 4N_2 + 6H_2O \quad (1)$$

$$6NO_2 + 8NH_3 \rightarrow 7N_2 + 12H_2O \quad (2)$$

The waste gas temperatures specified in this patent require that catalysts be used to increase the reaction velocity. Apart from the high investment costs, catalysts involve the risk of clogging from waste gases with solid pollutants (e.g. ash) or even being deactivated. Furthermore, an artificial nitrogen oxide source is required for the purification of the ammonia-containing waste gas.

A similar purification process is mentioned in EP1350552B1. In a first step, the ammonia is combusted in a thermal post-combustion plant, which will inevitably produce nitrogen oxides. The aim of the invention is to not combust the ammonia completely and to thus use the non-combusted ammonia portion in a further step for the selective catalytic reduction of the nitrogen oxides. This process makes it necessary to install a sophisticated control system.

Another alternative for the depletion of ammonia in waste gases is the adsorption onto, for example, activated carbon or zeolites as disclosed by U.S. Pat. No. 6,261,345 B1. A disadvantage of this process is unsteady operation which will increase the demand for equipment.

The physical absorption of ammonia in the presence of a solvent such as water or glycols is also a process according to the state of the art as described in U.S. Pat. No. 5,230,877. The reachable purities of the waste gas, however, largely depend on the working conditions of the scrubbing unit such as temperature and pressure. Of advantage are high pressure and low temperature, which will, however, incur additional investment and operating cost.

Nitrogen oxides may be formed during the combustion of fossil fuels or are obtained during the production of nitric acid. Nitrogen oxides are detrimental to health and the environment and contribute to such phenomena as acid rain, smog and the formation of ozone, statutory maximum emission values for this substance being required for this reason. The limit value for boilers operated by natural gas recommended by the Technical Instructions on Air Quality Control, First General Administrative Regulation pertaining to the Federal Air Pollution Control Act, as of 2002, currently is 150 mg/Nm$^3$.

The most obvious procedure to achieve a depletion of nitrogen oxides is to modify the causative sources in an adequate way. Therefore special nitrogen oxide-lean burners can, for example, be used in heating boilers and/or the combustion including air pre-heating and waste gas return can be adjusted as required. Problematic in this connection is that the boundary conditions of the process may be opposed to such adjustment and that, from the financial point of view, the measures may additionally get quite expensive.

Widely used for the removal of nitrogen oxides from waste gases are, in particular, selective non-catalytic reduction (SNCR) and selective catalytic reduction (SCR), in which the ammonia and nitrogen oxides essentially react in the gas phase (SNCR) or on the catalyst surface (SCR) in compliance with the before-mentioned reaction equations (1) and (2).

The selective non-catalytic reduction (SNCR) takes place at a temperature between 850° C. and 1100° C. Here, an aqueous ammonia or urea solution usually serves as reducing agent. A temperature above 900° C. is required to reach the necessary reaction velocity. The process involves the problem that at temperatures above 1000° C. a higher amount of nitrogen oxides is formed from ammonia according to the following reaction equation:

$$4NH_3+5O_2 \rightarrow 4NO+6H_2O \quad (3)$$

In contrast to this, the selective catalytic reduction takes place at temperatures between 150° C. and 550° C. and the risk of an increased nitrogen oxide formation is to be regarded as rather low. This process, however, requires the use of a catalyst. Such catalysts mainly consist of heavy metal oxides, zeolites, activated char and iron oxide-chromium oxides.

SNCR and SCR may also be combined with each other to utilise the advantages of both processes (low nitrogen oxide emissions and low catalyst demand) (e.g. pursuant to DE 690 06 367 T2). This makes it necessary, however, that the waste gas is of the respective temperatures required by both processes.

Main fields of application of SNCR and SCR are, for example, the nitrogen oxide depletion of waste gases from power stations and waste incineration plants and the purification of waste air from nitric acid production plants. The SCR process has recently been used for the depletion of nitrogen oxides in automobile emissions. The use of SNCR and SCR in ammonia/urea production plants does so far not constitute the state of the art.

The state of the art only discloses to treat and purify such waste gas flows that contain ammonia and/or nitrogen oxides separately of each other according to the before-mentioned methods. Such methods are very equipment-intensive and in addition extremely cost-intensive.

SUMMARY OF THE INVENTION

It is the aim of the invention to provide a process which allows the simultaneous combined depletion of ammonia or nitrogen oxides of two separate waste gas flows of an industrial plant, one of which contains ammonia and the other nitrogen oxides, such that the emission limits required by law of one or both noxious substances are observed. A further aim is to integrate the novel process into existing industrial plants and to solve the above-described problematic nature of a separate waste gas treatment.

This is achieved by the use of a process for the combined removal of both ammonia in one or more ammonia-containing waste gas flows and nitrogen oxides in one or more additional nitrogen oxide-containing waste gas flows in a combined ammonia/urea synthesis plant according to selective non-catalytic reduction in a temperature range from 850° C. to 1100°, by which nitrogen oxide reduction rates of up to 80% are achieved, or according to selective catalytic reduction in a temperature range from 150° C. to 550° C., by which nitrogen oxide reduction rates of up to 99% are achieved, in which the ammonia and the nitrogen oxides react with one another and are converted to give nitrogen and water, the ammonia-containing waste gas flow to be treated from a low-pressure absorber and/or an atmospheric absorber of the urea synthesis plant unit being mixed with the nitrogen oxide-containing waste gas flow to be treated from a flue gas duct of a primary reformer of the ammonia synthesis plant unit of the combined ammonia/urea synthesis plant and being submitted to a selective non-catalytic reduction or a selective catalytic reduction depending on the temperature of the mixture and depending on the nitrogen oxide reduction rate to be reached, both the ammonia and the nitrogen oxides of the mixed waste gas flows being depleted simultaneously during the same process step.

DETAILED DESCRIPTION OF THE PREFERRED EMBODIMENTS

The described ammonia-containing waste gas flow which is mixed with the nitrogen oxide-containing waste gas flow may contain additional lower alkanes and/or hydrogen and/or oxygen.

In an advantageous embodiment of the process, the ammonia concentration is adjusted hyperstoichiometrically to the nitrogen oxide concentration in the waste gas flows to be mixed so that the conversion into nitrogen and water takes place without addition of any other components.

In another optional embodiment of the invention, a reducing agent selected from a group comprising ammonia, aqueous ammonia and urea solution is additionally injected into the mixed flows of ammonia-containing waste gas and nitrogen oxide-containing waste gas.

In a further embodiment of the invention, a selective non-catalytic reduction is carried out first, which is followed by a selective catalytic reduction.

The catalyst for the selective catalytic reduction is preferably selected from a group comprising metal oxides (e.g. titanium dioxide, vanadium pentoxide), activated chars, iron oxide-chromium oxides and zeolites. The catalyst can be of a carrier-supported or not carrier-supported type on the basis of $SiO_2$, alumino-silicate or $Al_2O_3$. The optional embodiments comprise fixed beds, fluidised beds and preferably monolithic or multi-cellular structures.

The claimed process is suitable for waste gases of an ammonia content of 30 to 50,000 mg/Nm$^3$ and a nitrogen oxide content of 75 to 1500 mg/Nm$^3$.

Some embodiments of the invention are described below in more detail by three figures.

FIG. 1: represents a schematic process sketch showing the selective non-catalytic reduction for the combined simultaneous removal of ammonia and nitrogen oxides of two separate waste gas flows.

Figure 2:
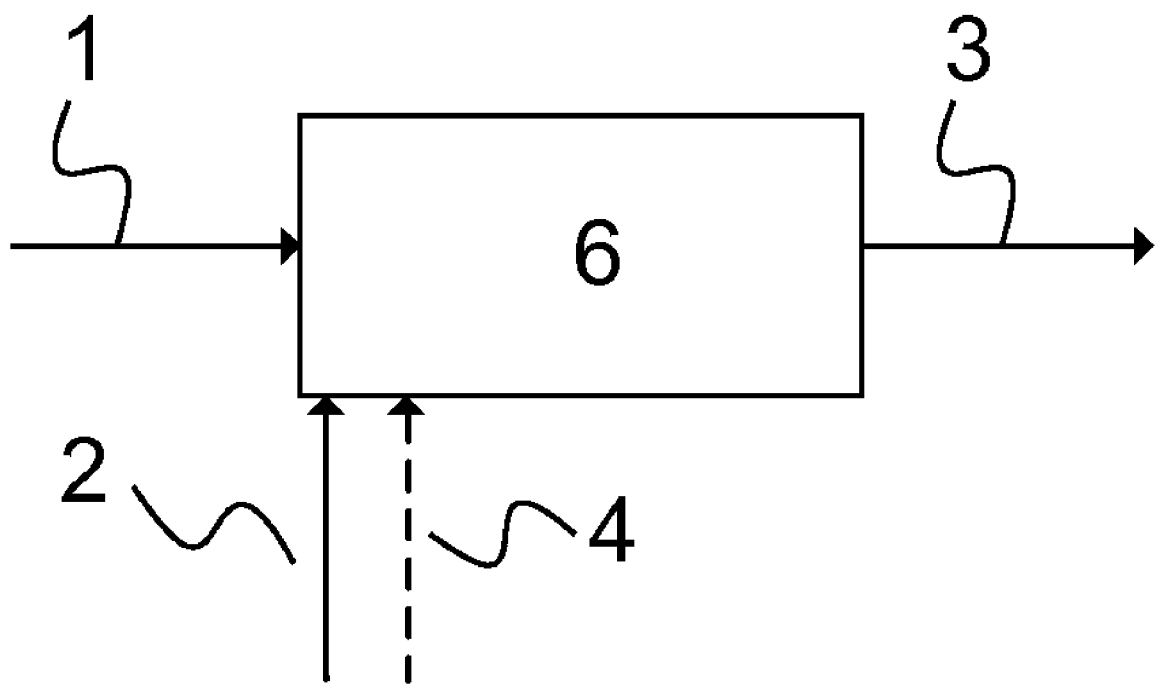

FIG. 2: represents an embodiment of the invention in which the selective catalytic reduction for the combined simultaneous removal of ammonia and nitrogen oxides of two separate waste gas flows is shown in a schematic.

Figure 3:
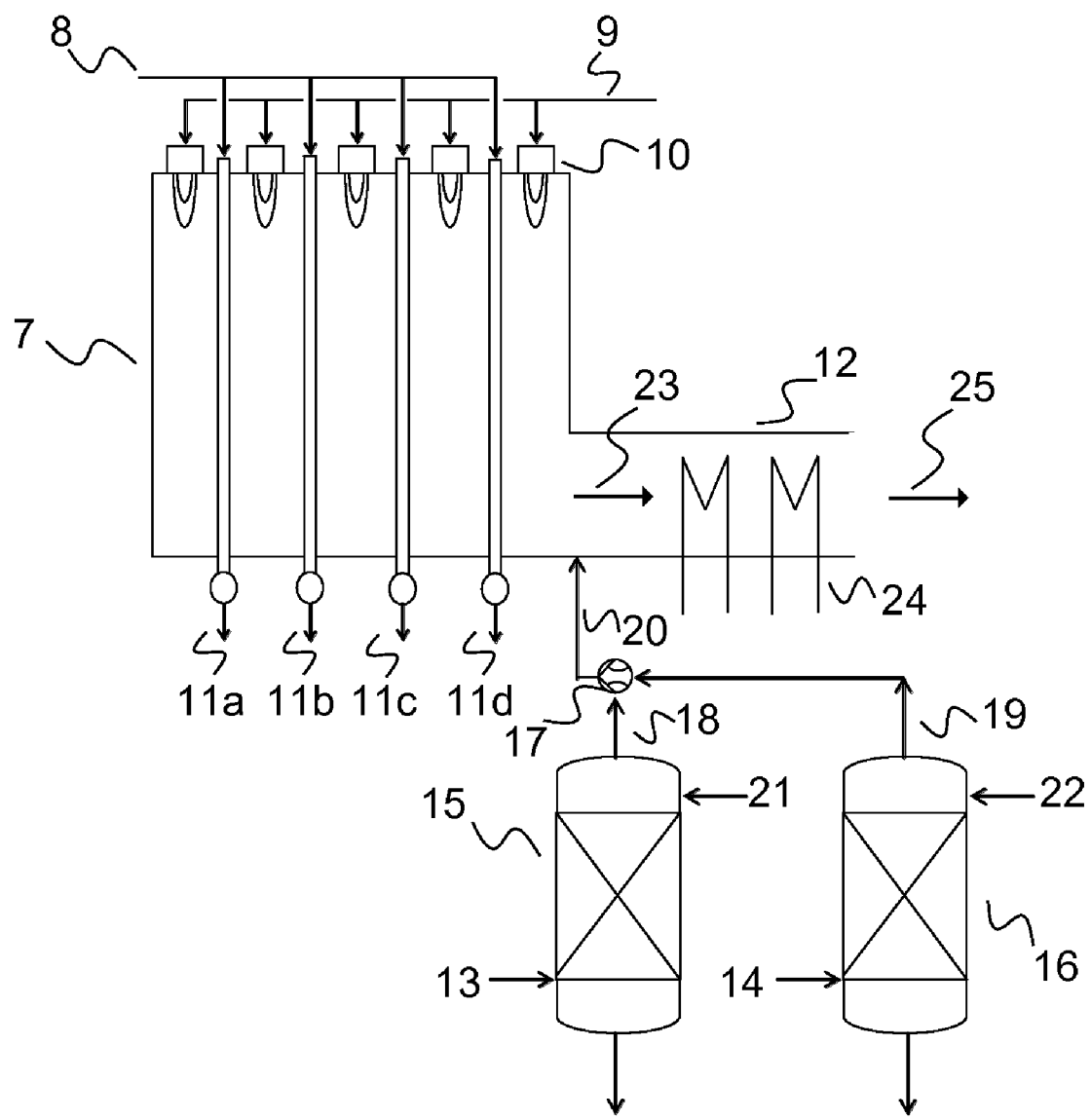

FIG. 3: represents a schematic drawing of a combined simultaneous waste gas purification in a combined ammonia/urea plant based on the non-selective catalytic reduction.

In FIG. 1 an ammonia-containing waste gas 1 is mixed with a nitrogen oxide-containing waste gas 2 at a temperature between 850° and 1100° C. In a suitable device 5, the ammonia and the nitrogen oxides react in a gas phase reaction to give nitrogen and water which can be discharged to the environment via a gas flow 3. In this reaction, hydrocarbons also borne by the ammonia-containing gas 1 as, for example, methane are thermally converted to give carbon dioxide and water. By this method it is possible to achieve nitrogen oxide reduction rates of up to 80%. The reaction of ammonia and nitrogen oxides does not take place in the presence of a catalyst and is referred to as selective non-catalytic reduction. As described at the beginning this process according to the state of the art only aims at the reduction of the nitrogen oxides.

In another process variant which is shown in FIG. 2 an ammonia-containing waste gas 1 is mixed with a nitrogen oxide-containing waste gas 2 via a suitable catalyst material 6 integrated into a suitable device, the conversion also giving nitrogen and water. Here as well, the gas flow obtained can be discharged to the environment. This reaction takes place in a temperature range from 150° to 550° C. The reaction of ammonia and nitrogen oxides takes place in the presence of a catalyst and is referred to as selective catalytic reduction. This process involves the advantage that the temperature range for the conversion is lower than in the selective non-catalytic reduction, as it involves a low risk of the formation of nitrogen oxides from the ammonia to be depleted. By this process it is possible to achieve nitrogen oxide reduction rates of up to 99%. Here as well, the original purpose of this technology is exclusively for the depletion of nitrogen oxides.

Should the amount of nitrogen oxides be hyperstoichiometric in comparison to the ammonia, both the selective non-catalytic reduction shown in FIG. 1 and the selective catalytic reduction shown in FIG. 2 can be provided with an additional injection of ammonia, aqueous ammonia or urea solution 4. In this way it is possible to reduce the nitrogen oxide concentration further than it would be possible with the amounts of ammonia contained in the waste gases used.

Should the amounts of nitrogen oxides be substoichiometric, it is necessary to check the ammonia and nitrogen oxide concentrations in the treated waste gas resulting from the selective non-catalytic reduction or the selective catalytic reduction for the limit values to be reached. Should a notably hyperstoichiometric amount of ammonia lead to an excessive ammonia slip, part of the ammonia-containing waste gas is to be treated separately by other processes as, for example, acid scrubbing.

In the following the invention is described by means of an exemplary configuration and shown graphically in FIG. 3. Here it is assumed that ammonia-containing waste gas flows 18 and 19 are taken from a low-pressure absorber 16 and atmospheric absorber 15 of a urea synthesis plant. Treatment flow 13 of atmospheric absorber 15 is obtained from a unit in the urea synthesis plant used for evaporation, whereas treatment flow 14 is obtained from the synthesis unit of the urea plant. Scrubbing solutions 21 and 22 are fed to the two absorbers. Waste gas flows 18 and 19 purified in these processes, however, still contain ammonia in a mass concentration from 0.1 to 5%. In addition, they contain methane and hydrogen, which can especially be determined in ammonia-containing waste gas flow 19 of low-pressure absorber 16.

A nitrogen oxide-containing waste gas flow is flue gas 23 from primary reformer 7 of an ammonia plant which is, nearly without exception, installed upstream of the urea plant. Flue gas 23 is produced by the combustion of a mixture 9 of natural gas and air via a burner 10 in primary reformer 7 which serves for the generation of synthesis gas flows 11a, 11b, 11c, 11d from a natural gas flow 8. The nitrogen oxide concentration is generally near the hitherto standard limit value of 150 mg/Nm$^3$. Flue gas 23 leaves primary reformer 7 through flue gas duct 12, in which major part of the heat energy still entrained is recovered by heat exchanger 24.

To carry out the selective non-catalytic reduction, individual flows 18 and 19 are mixed first. As the pressure levels are different, ejector 17 can be used. Subsequently the mixture of ammonia-containing waste gas flows 20 is added to nitrogen oxide-containing flue gas 23 at the entry of flue gas duct 12. The temperatures of approx. 1000° C. at this point are suitable for the process. At the entry of the flue gas duct, the nitrogen oxides are mainly present in the form of NO (>85%), the portion of $NO_2$ being increased in the course of flue gas duct 12. For this reason, NO is predominantly converted in the selective non-catalytic reduction according to the above reaction equation (1). Waste gas flow 25 may subsequently be discharged to the environment.

As a result of the small ammonia-containing flows 18, 19, being in a range of <2 t/h, and the large flue gas flow 23, being in a range of >300 t/h, the content of nitrogen oxides is hyperstoichiometric so that the ammonia will be converted nearly completely if the flows are ideally mixed. As regards the nitrogen oxides, it is possible to reduce the concentrations in the percent range between 5 and 15%. A further depletion of the nitrogen oxides would be possible if a reducing agent such as ammonia was added and the selective catalytic reduction used in addition. The amounts of hydrogen and methane entrained by waste gas flow 19 are also converted at the high temperatures. The resulting temperature increase of approx. 2-3° C. is low and hence of no significant effect on the process.

Advantages involved in the invention:
Process that can be integrated easily into existing industrial plants.
Use of processes already established.
No further necessity of conventional treatment of waste gas flows by means of acids or flares.
No further necessity of expensive treatment and disposal of waste water as
No further separate waste gas treatment of ammonia-containing and nitrogen oxide-containing waste gas flows, resulting in a higher economic efficiency of the plant.
Saving of reducing agents required for the nitrogen oxide depletion.

LIST OF REFERENCE NUMBERS AND DESIGNATIONS

1 Ammonia-containing waste gas
2 Nitrogen oxide-containing waste gas
3 Gas flow
4 Ammonia, aqueous ammonia or urea solution
5 Device
6 Catalyst material
7 Primary reformer
8 Natural gas
9 Mixture of natural gas and air
10 Burner
11a, b, c, d Synthesis gas
12 Flue gas duct 13 Treatment flow
14 Treatment flow
15 Atmospheric absorber
16 Low pressure absorber
17 Ejector
18 Ammonia-containing waste gas flow
19 Ammonia-containing waste gas flow
20 Mixture of ammonia-containing waste gas flows
21 Scrubbing solution
22 Scrubbing solution
23 Flue gas
24 Heat exchanger
25 Purified flow

The invention claimed is:

1. A process for the combined removal of both ammonia in one or more ammonia-containing waste gas flows and nitrogen oxides in one or more additional nitrogen oxide-containing waste gas flows in a combined ammonia/urea synthesis plant, comprising selective non-catalytic reduction in a temperature range from 850° C. to 1100°, by which nitrogen oxide reduction rates of up to 80% are achieved, or selective catalytic reduction in a temperature range from 150° C. to 550° C., by which nitrogen oxide reduction rates of up to 99% are achieved, in which the ammonia and the nitrogen oxides react with one another to give nitrogen and water, wherein an ammonia-containing waste gas flow from at least one of a low-pressure absorber or an atmospheric absorber of the urea synthesis plant is mixed with the nitrogen oxide-containing waste gas flow of a flue gas duct of a primary reformer of the ammonia synthesis plant and is submitted to a selective non-catalytic reduction or a selective catalytic reduction depending on the temperature of the mixture and depending on the nitrogen oxide reduction rate to be reached, both the ammonia and the nitrogen oxides of the mixed waste gas flows being depleted simultaneously during the same process step.

2. The process of claim 1, wherein the ammonia-containing waste gas flow which is mixed with the nitrogen oxide-containing waste gas flow additionally contains one or more of lower alkanes, hydrogen or oxygen.

3. The process of claim 1, wherein the ammonia concentration is adjusted hyperstoichiometrically to the nitrogen oxide concentration in the waste gas flows so that the conversion into nitrogen and water takes place without addition of any other components.

4. The process of claim 1, wherein a reducing agent selected from the group consisting of ammonia, aqueous ammonia, urea solution, and mixtures thereof is additionally injected into the mixed flows of ammonia-containing waste gas and nitrogen oxide-containing waste gas.

5. The process of claim 1, wherein a selective non-catalytic reduction is carried out, followed by a selective catalytic reduction.

6. The process of claim 1, wherein a catalyst is used for the selective catalytic reduction which is selected from the group consisting of heavy metal oxides, activated char, iron oxide-chromium oxides, zeolites, and mixtures thereof.

7. The process of claim 1, wherein the catalyst is provided as fixed bed or fluidised bed.

8. The process of claim 7, wherein the bed is a monolithic or multi-cellular structure.

9. The process of claim 1, wherein the ammonia content of the ammonia-containing waste gas is 30 to 50,000 mg/Nm$^3$.

10. The process of claim 1, wherein the nitrogen oxide content of the nitrogen oxide-containing waste gas is 75 to 1500 mg/Nm$^3$.

* * * * *